US009422878B2

(12) United States Patent
Pohlkamp et al.

(10) Patent No.: US 9,422,878 B2
(45) Date of Patent: Aug. 23, 2016

(54) EGR OPERATION METHOD AND SYSTEM FOR INCREASED DRIVABILITY

(71) Applicant: Ford Global Technologies, LLC, Dearborn, MI (US)

(72) Inventors: Kyle Pohlkamp, Superior Township, MI (US); Brien Lloyd Fulton, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 14/252,595

(22) Filed: Apr. 14, 2014

(65) Prior Publication Data

US 2015/0292423 A1    Oct. 15, 2015

(51) Int. Cl.
*F02B 1/12* (2006.01)
*F02D 41/00* (2006.01)
*B60W 20/00* (2016.01)
(Continued)

(52) U.S. Cl.
CPC .......... *F02D 41/0077* (2013.01); *B60W 20/00* (2013.01); *F02D 29/02* (2013.01); *F02D 41/0065* (2013.01); *F02M 25/0709* (2013.01); *F02M 25/0718* (2013.01); *F02M 25/0728* (2013.01); *F02M 25/0751* (2013.01); *F02M 25/0755* (2013.01); *F02D 41/0055* (2013.01); *F02D 41/0072* (2013.01); *F02D 41/1458* (2013.01); *Y02T 10/47* (2013.01); *Y10S 903/905* (2013.01)

(58) Field of Classification Search
CPC .......... F02D 41/0002; F02D 41/0065; F02D 13/04; F02D 41/0055; F02D 11/10; F02D 41/0077; F02D 41/0052; F02D 41/144; F02D 41/1456; F02D 31/005; F02D 41/146; F02D 41/18; F02D 35/028; F02M 25/0754; F02M 25/0702; F02M 25/0728; F02M 25/0756; F02M 25/098; F02B 1/12; F02B 37/10; F02C 3/34
USPC .............. 123/321, 399, 568.11, 568.16, 674, 123/676, 501, 698; 701/108, 22, 30.8, 102, 701/104; 60/39.52, 276
See application file for complete search history.

(56) References Cited

U.S. PATENT DOCUMENTS 4,763,265 A * 8/1988 Kawanabe ............ F02D 31/005
123/700
4,870,941 A * 10/1989 Hisatomi ........... F02M 25/0702
123/568.16

(Continued)

FOREIGN PATENT DOCUMENTS

CN    103180550 A    6/2013
EP    2060772 A2    5/2009

(Continued)

OTHER PUBLICATIONS

Hilditch, James A. et al, "Low-Pressure EGR Control During Compressor Bypass Valve Operation," U.S. Appl. No. 13/746,232, filed Jan. 1, 2013, 36 pages.

*Primary Examiner* — Yuri Kan
(74) *Attorney, Agent, or Firm* — Julia Voutyras; Alleman Hall McCoy Russell & Tuttle LLP

(57) ABSTRACT

A method for an engine may comprise, in response to an EGR valve closing, determining an EGR oxygen content, and purging an EGR system when the EGR oxygen content is less than a threshold oxygen content.

20 Claims, 5 Drawing Sheets

(51) Int. Cl.
  *F02M 25/07* (2006.01)
  *F02D 29/02* (2006.01)
  *F02D 41/14* (2006.01)

(56) References Cited

U.S. PATENT DOCUMENTS

| | | | | |
|---|---|---|---|---|
| 6,047,692 | A * | 4/2000 | Toyoda | F02M 25/089 123/516 |
| 6,397,829 | B1 * | 6/2002 | Toyoda | F02D 41/0042 123/674 |
| 7,866,140 | B2 * | 1/2011 | Chillar | F02C 3/34 123/568.12 |
| 8,150,601 | B2 * | 4/2012 | Kawamura | F02D 41/0077 123/568.21 |
| 2005/0217644 | A1 * | 10/2005 | Shimazaki | F02D 35/028 123/501 |
| 2008/0275627 | A1 * | 11/2008 | Matsunaga | F02D 41/144 701/108 |
| 2010/0108045 | A1 * | 5/2010 | Enomoto | F02B 37/10 123/674 |
| 2010/0211295 | A1 * | 8/2010 | Ide | F02D 41/0002 701/108 |
| 2010/0263627 | A1 * | 10/2010 | Whitney | F02D 11/10 123/399 |
| 2011/0107741 | A1 * | 5/2011 | LaRose, Jr. | F02D 41/0002 60/276 |
| 2012/0037134 | A1 | 2/2012 | Jankovic et al. | |
| 2012/0247439 | A1 * | 10/2012 | Ramappan | F02B 1/12 123/568.11 |
| 2012/0303206 | A1 * | 11/2012 | Rajagopalan | F02D 41/146 701/30.8 |
| 2013/0014734 | A1 * | 1/2013 | Barbero | F02M 25/0728 123/568.16 |
| 2013/0197785 | A1 * | 8/2013 | Bhasham | F02D 41/18 701/104 |
| 2013/0255624 | A1 * | 10/2013 | Chaves | F02D 13/04 123/321 |
| 2013/0305714 | A1 | 11/2013 | Rollinger et al. | |

FOREIGN PATENT DOCUMENTS

| | | | |
|---|---|---|---|
| EP | 2211044 B1 | 1/2013 | |
| EP | 2249473 B1 | 2/2013 | |
| JP | 2009274671 A | * 11/2009 | B60W 10/06 |
| JP | 2009274671 A | * 11/2009 | |
| WO | 02061262 A1 | 8/2002 | |

* cited by examiner

EGR OPERATION METHOD AND SYSTEM FOR INCREASED DRIVABILITY

FIELD

The present description relates to operation of a vehicle exhaust gas recirculation (EGR) system to improve and increase vehicle drivability.

BACKGROUND/SUMMARY

Internal combustion engines may recirculate a portion of the exhaust gas to the engine intake to mitigate high engine combustion temperatures and to reduce formation and emission of NOx gases. Conventionally, during certain engine conditions, exhaust gas recirculation (EGR) may be stopped in order to maintain vehicle drivability. For example, at very high engine loads or full throttle, EGR may be shut off in order to increase oxygen intake to the engine and to meet the demanded engine load. As a further example, EGR may be shut off during engine idle conditions to reduce rough engine idle due to unstable combustion.

The inventors herein have recognized potential issues with the above conventional approaches. Namely, after EGR is switched off, the oxygen concentration in the exhaust gas stored in the EGR system (e.g., exhaust manifold, and/or exhaust recirculation line) may be very low. Accordingly, when EGR is resumed, flow of exhaust gas with low oxygen concentration levels may be delivered to the engine cylinders, which may starve the engine of oxygen and cause engine operation and vehicle drivability problems such as misfires, stumbling, and the like.

One approach that addresses the aforementioned issues is a method for an engine, comprising, in response to an EGR valve closing, determining an EGR oxygen content, and purging an EGR system when the EGR oxygen content is less than a threshold oxygen content.

In another embodiment, a method for a vehicle engine may comprise purging an EGR system, including opening an EGR valve, when the EGR valve would otherwise be closed, based on a measured oxygen concentration of the EGR system being less than a threshold oxygen concentration.

In another embodiment, an engine system may comprise an EGR system, comprising an EGR valve, and a controller, including executable instructions to, in response to an EGR valve closing, determine an EGR oxygen content; and purge an EGR system when the EGR oxygen content is less than a threshold oxygen content.

The above advantages as well as other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
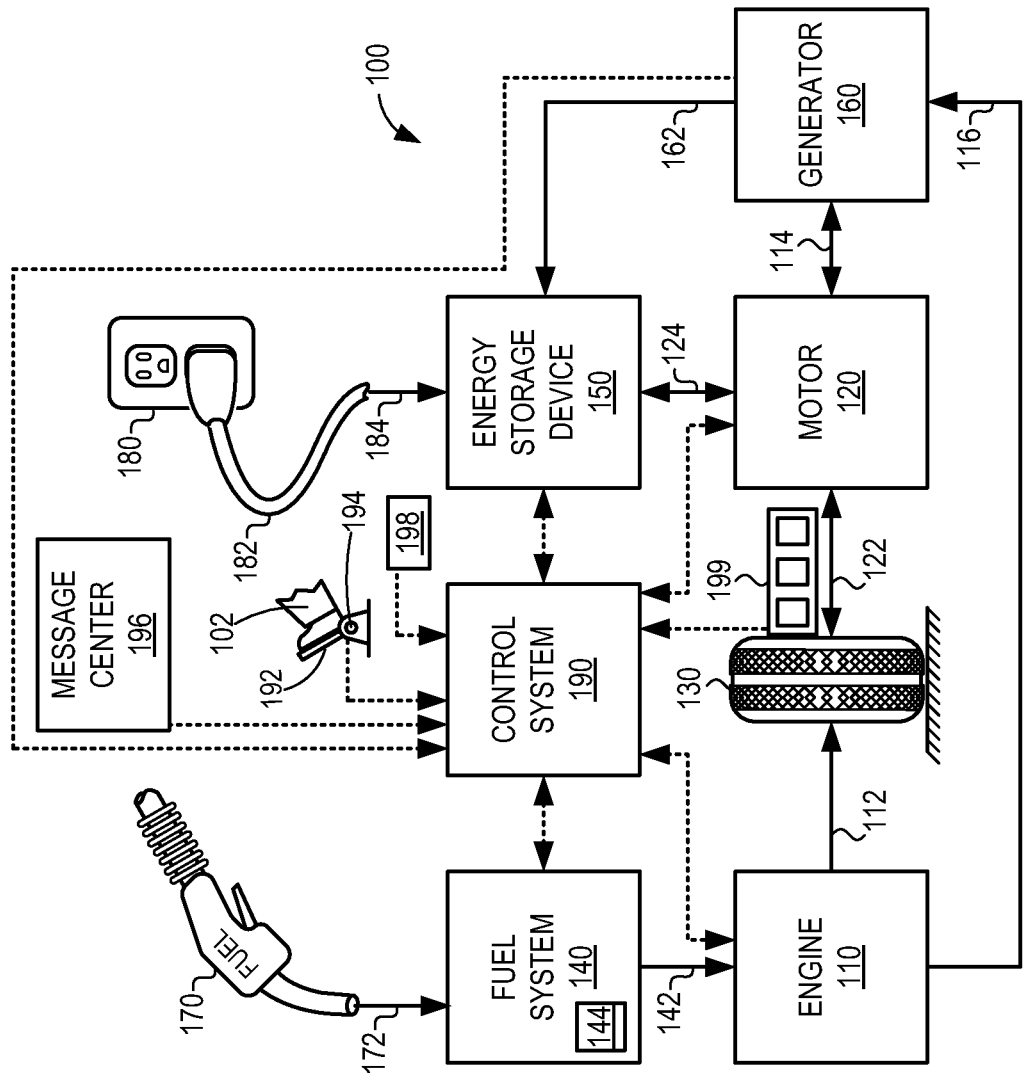
FIG. 1 shows an example of a propulsion system for a vehicle, including an engine, energy storage device, fuel system, and motor.
Figure 2:
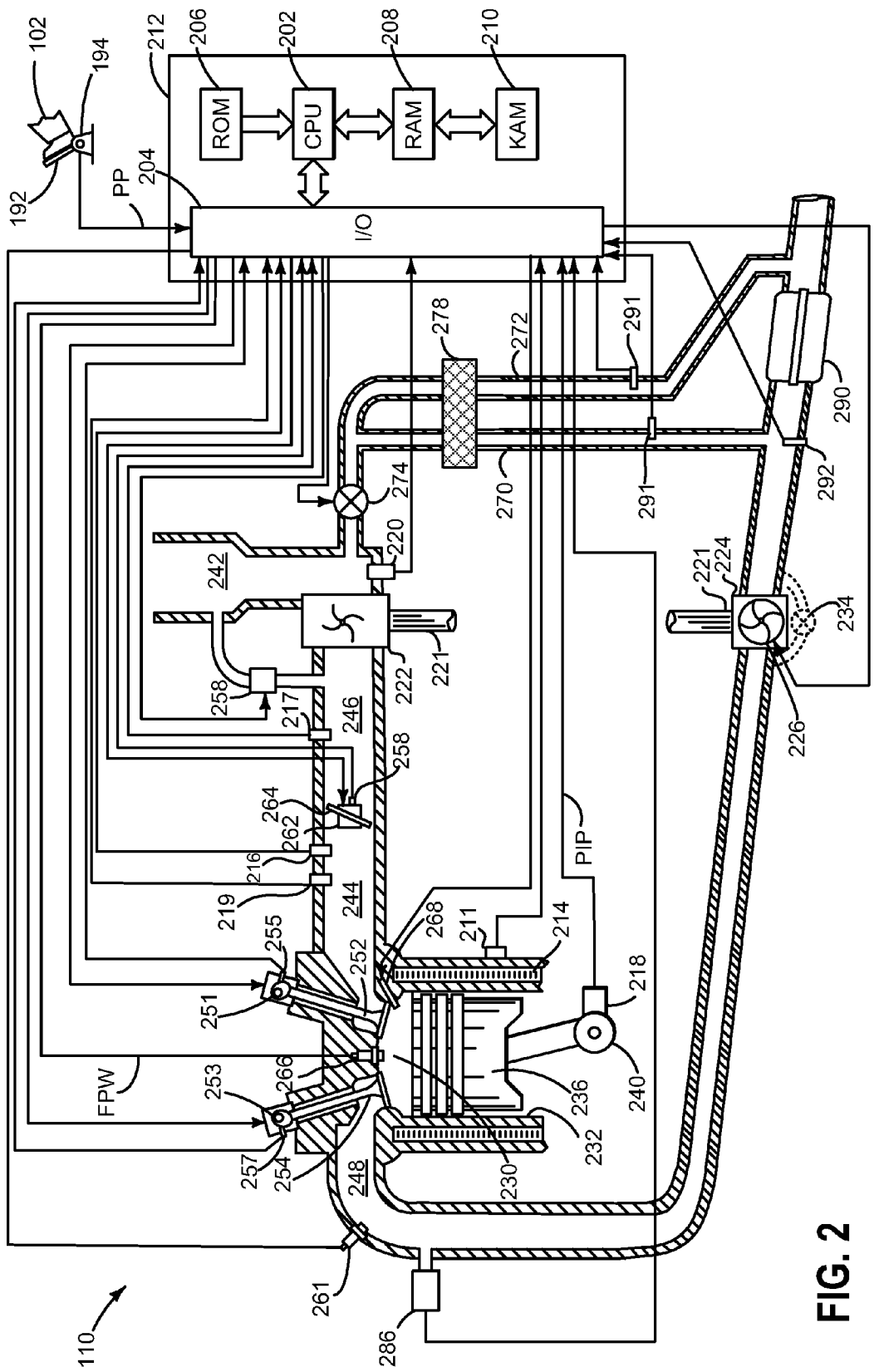
FIG. 2 shows an example of an engine, including an exhaust gas recirculation valve.
Figure 3:
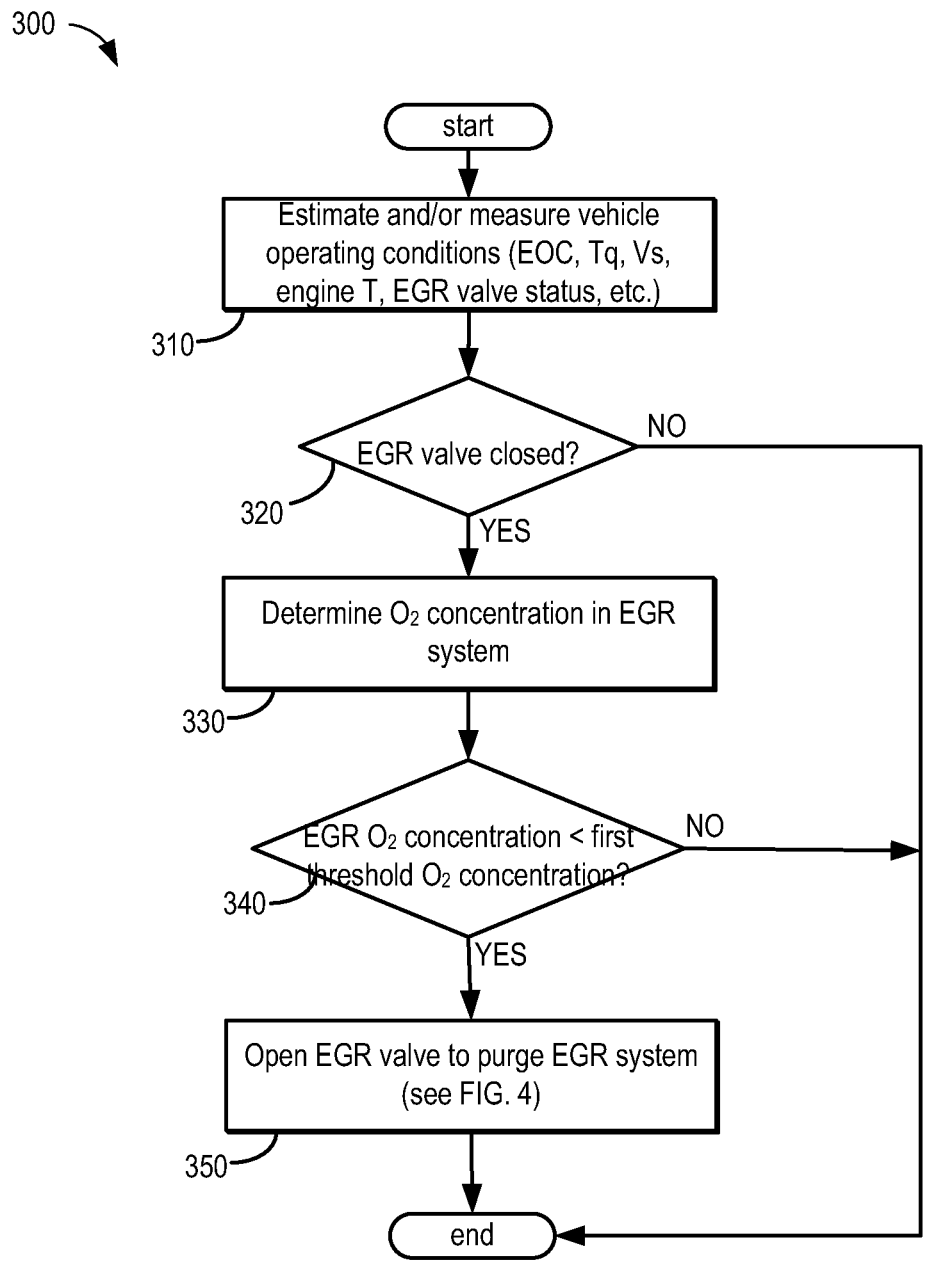
FIG. 3 shows a flow chart for an example method of recirculating exhaust gas in the engine of FIG. 2.
Figure 5:
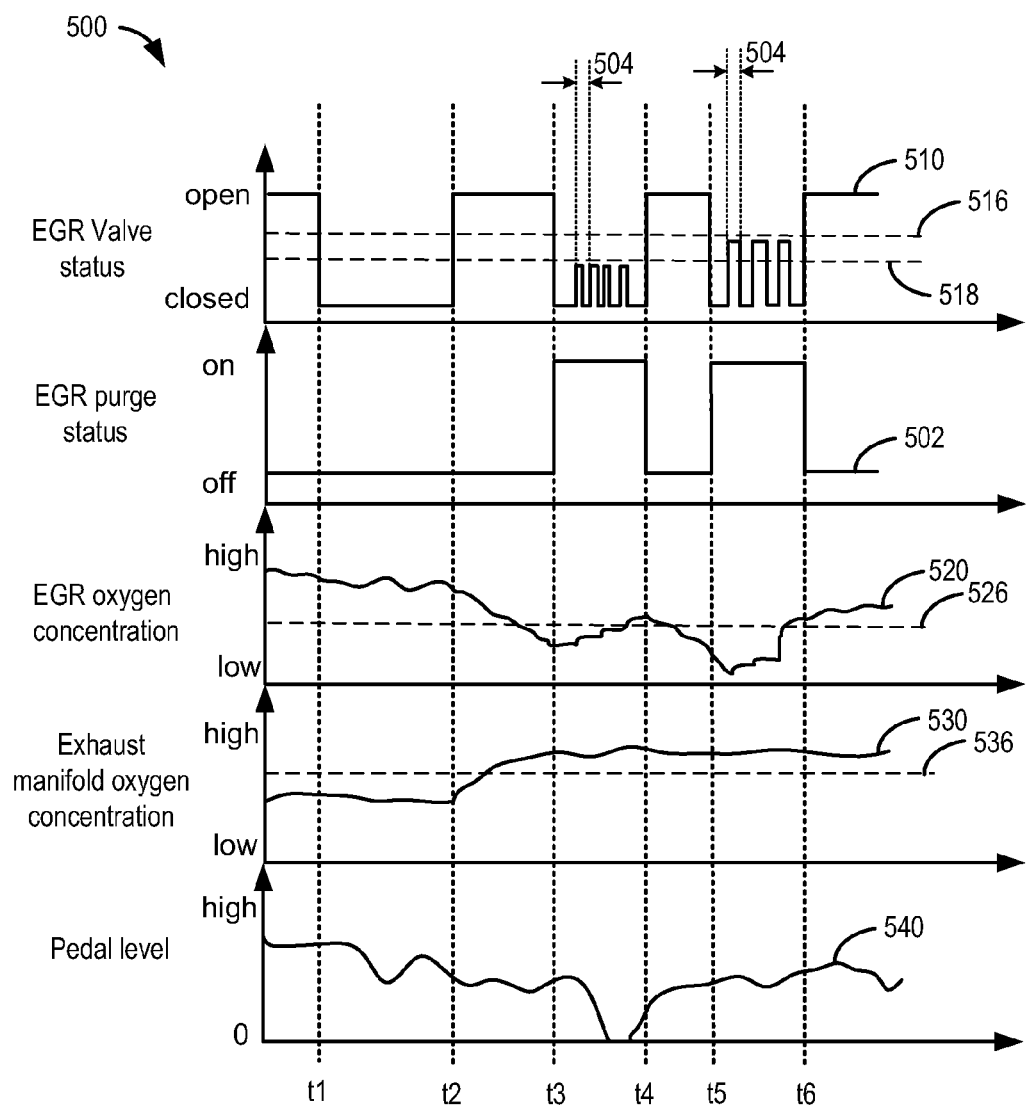
FIG. 5 shows an example timeline for operating the engine of FIG. 2.

The present description is related to operating an exhaust gas recirculation (EGR) system of a vehicle to improve and increase vehicle drivability. In particular, vehicle drivability may be increased via the systems and method described herein. FIG. 1 illustrates an example of a propulsion system for a vehicle comprising an engine, motor, generator, fuel system and control system. FIG. 2 illustrates an example of an internal combustion engine, although the systems and method disclosed can be applicable to compression ignition engines and turbines. The example engine shown in FIG. 2 comprises an exhaust gas system including exhaust gas recirculation. FIG. 3 depicts a flow chart for an example method of recirculating exhaust gas in the engine of FIG. 2, while FIG. 5 illustrates an example timeline for operating the engine of FIG. 2.

FIG. 1 illustrates an example a vehicle propulsion system 100. Vehicle propulsion system 100 may comprise a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150 such as a battery. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated.

During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The vehicle propulsion system may be configured to transition between two or more of the operating modes described above depending on vehicle operating conditions.

Fuel system 140 may include one or more fuel storage tanks 144 for storing fuel on-board the vehicle. For example, fuel tank 144 may store one or more liquid fuels, including but not limited to gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, an exhaust gas grid heater, an exhaust gas recirculation cooler, etc. As a non-limiting example, energy storage device 150 may include one or more batteries and/or capacitors.

Control system 190 may communicate with one or more of engine 110, motor 120, fuel system 140, energy storage device 150, and generator 160. As will be described by FIG. 2, control system 190 may comprise controller 212 and may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (state-of-charge).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion.

This plug-in hybrid electric vehicle, as described with reference to vehicle propulsion system 100, may be configured to utilize a secondary form of energy (e.g. electrical energy) that is periodically received from an energy source that is not otherwise part of the vehicle.

The vehicle propulsion system 100 may also include a message center 196, ambient temperature/humidity sensor 198, and a roll stability control sensor, such as a lateral and/or longitudinal and/or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Referring now to FIG. 2, it illustrates an internal combustion engine 110 comprising a plurality of cylinders, one cylinder of which is shown in FIG. 2, and is controlled by control system 190, the control system 190 comprising electronic engine controller 212. Engine 110 includes combustion chamber 230 and cylinder walls 232 with piston 236 positioned therein and connected to crankshaft 240. Combustion chamber 230 is shown communicating with intake manifold 244 and exhaust manifold 248 via respective intake valve 252 and exhaust valve 254. Each intake and exhaust valve may be operated by an intake cam 251 and an exhaust cam 253. The position of intake cam 251 may be determined by intake cam sensor 255. The position of exhaust cam 253 may be determined by exhaust cam sensor 257.

Fuel injector 266 is shown positioned to inject fuel directly into combustion chamber 230, which is known to those skilled in the art as direct injection. Fuel injector 266 may deliver fuel in proportion to the pulse width of signal FPW from controller 212. Fuel may be delivered to fuel injector 266 by a fuel system 140 as shown in FIG. 1. Fuel pressure delivered by the fuel system may be adjusted by varying an inlet metering valve regulating flow to a fuel pump (not shown) and a fuel rail pressure control valve. A second fuel injector 261 is shown positioned to inject fuel downstream from the combustion chamber 230 into the exhaust manifold 248, which is known to those skilled in the art as post injection. Fuel injector 261 can deliver fuel in proportion to the signal from controller 212. Fuel may be delivered to fuel injector 261 by a fuel system 140 as shown in FIG. 1. Fuel pressure delivered by the fuel system may be adjusted by varying an inlet metering valve regulating flow to a fuel pump (not shown) and a fuel rail pressure control valve.

Intake manifold 244 is shown communicating with optional electronic throttle valve 262 which adjusts a position of throttle plate 264 to control air flow from intake boost chamber 246. Compressor 222 draws air from air intake 242 to supply boost chamber 246. Exhaust gases spin turbine 224 which is coupled to compressor 222 via shaft 221. In some examples, a charge or intake air cooler may also be provided. Compressor speed may be adjusted via adjusting a position of variable vane control 226 or compressor bypass valve 228. In alternative examples, a waste gate 234 may replace or be used in addition to variable vane control 226. Variable vane control 226 adjusts a position of variable geometry turbine vanes. Exhaust gases can pass through turbine 224 supplying little energy to rotate turbine 224 when vanes are in an open position. Exhaust gases can pass through turbine 224 and impart increased force on turbine 224 when vanes are in a closed position. Alternatively, waste gate 234 allows exhaust gases to flow around turbine 224 so as to reduce the amount of energy supplied to the turbine. Furthermore, turbine 224 may be a turbine with fixed geometry. Compressor bypass valve 228 allows compressed air at the outlet of compressor 222 to be returned to the input of compressor 222. In this way, the efficiency of compressor 222 may be reduced so as to affect the flow of compressor 222 and reduce the possibility of compressor surge.

Combustion is initiated in combustion chamber 230 when fuel ignites without a dedicated spark source such as a spark plug as piston 236 approaches top-dead-center compression stroke and cylinder pressure increases. In some examples, a universal Exhaust gas Oxygen (UEGO) sensor 286 may be coupled to exhaust manifold 248 upstream of exhaust gas aftertreatment device 290. In other examples, the UEGO sensor 286 may be located downstream of one or more exhaust after treatment devices. Further, in some examples, the UEGO sensor 286 may be replaced by a NOx sensor that has both NOx and oxygen sensing elements. At lower engine temperatures a glow plug 268 may convert electrical energy into thermal energy so as to raise a temperature in combustion chamber 230. By raising temperature of combustion chamber 230, it may be easier to ignite a cylinder air-fuel mixture via compression.

Exhaust gas aftertreatment device 290 can include a particulate filter and catalyst bricks, in one example. In another example, multiple exhaust gas aftertreatment devices, each with multiple bricks, can be used. Exhaust gas aftertreatment device 290 can include an oxidation catalyst in one example. In other examples, the exhaust gas aftertreatment device may include a lean NOx trap, a hydrocarbon trap, a CO trap, a selective catalyst reduction (SCR) catalyst, and/or a diesel particulate filter (DPF).

The exhaust gas pressure is lowered as it passes through turbine 224, the exhaust gas transferring energy to rotate the vanes of turbine 224. As such, the exhaust gas pressure downstream of turbine 224 may be lower than exhaust gas pressure upstream of turbine 224. Because exhaust gas is decompressed and cooled as it flows through turbine 224, the exhaust gas may only slowly heat up downstream exhaust gas aftertreatment device 290. In the case of a cold start, the conversion efficiency of the exhaust gas aftertreatment device 290 will be low, for a period of time, until the exhaust gas can warm the exhaust gas aftertreatment device 290 appreciably, before which the discharged exhaust gas may contain a high content of pollutants (e.g., CO, NOx, HC). In some examples additional exhaust aftertreatment devices such as a grid heater or other heat transfer means may be employed to aid in warming the exhaust gas, thereby reducing vehicle emissions.

A portion of the exhaust gas may be recycled or recirculated via high pressure EGR line 270 and/or low pressure EGR line 272 to air intake 242. As shown in FIG. 2, high pressure EGR line 270 may be positioned to fluidly couple the air intake 242 upstream of the compressor 222 with the exhaust manifold 248 downstream of the turbine 224 and upstream of exhaust gas aftertreatment device 290. In other examples, high pressure EGR line 270 may be positioned to fluidly couple the boost chamber 246 or the intake manifold 244 downstream of the compressor 222 with the exhaust manifold 248 upstream of the turbine 224. As shown in FIG. 2, low pressure EGR 272 may be positioned to fluidly couple the air intake 242 with the exhaust manifold 248 downstream of exhaust gas aftertreatment device 290. In other examples, low pressure EGR 272 may be positioned to fluidly couple the air intake 242 upstream of compressor 222 with the exhaust manifold 248 between multiple aftertreatment devices 290 but before the muffler. When low pressure EGR gas is diverted from between or after multiple aftertreatment devices 290 to the air intake 242 upstream of the compressor 222, the oxygen content of the exhaust gas may be lower as compared to other low pressure and high pressure EGR line positions described. In one example, an EGR valve 274 can be opened by controller 212 to divert a portion of the exhaust gas downstream of the turbine 224 and upstream of the exhaust gas aftertreatment device 290 to EGR line 270. In some examples, there may be only one of the above described high pressure or low pressure EGR lines. In other examples, there may be a tandem EGR system comprising a high pressure EGR line 270 and a low pressure EGR line 272.

Furthermore, a portion of the recycled exhaust-gas can be directed through an exhaust-gas recirculation cooler 278. EGR cooler 278 may aid in controlling the EGR temperature by cooling the exhaust gases before they are recirculated to the air intake 242, boost chamber 246, and/or intake manifold 244. Although not shown in FIG. 2, high pressure EGR line 270 and low pressure EGR line 272 may comprise EGR cooler bypass control valves which may allow the EGR flow to bypass EGR cooler 278. Further still, in the case where the EGR system comprises an EGR cooler 278, and EGR valve 274 is positioned downstream (e.g., cold-side) of EGR cooler 278, the volume of the EGR system may include the fluid volume of the EGR cooler 278.

As shown in FIG. 2, EGR valve 274 is positioned at a downstream side of high pressure EGR line 270 and/or low pressure EGR line 272, closer to the intake 242 than the more upstream side near the exhaust aftertreatment device 290 and exhaust manifold 248. In this way, when EGR valve 274 is closed, the high pressure EGR line 270 and low pressure EGR line 272 are isolated from the intake 242. In other examples, EGR valve 274 may be positioned at a more upstream side of the high pressure EGR line 270 and/or low pressure EGR line 272. However, it may be advantageous to position EGR valve 274 at a more downstream position of high pressure EGR line 270 and/or low pressure EGR line 272 so that a larger volume of the high pressure EGR line 270 and/or low pressure EGR line 272 is isolated from intake 242 when EGR valve 274 is closed.

Exhaust gas that is diverted or recirculated via EGR valve 274 may flow directly to intake 242, where it displaces air. In some examples, the EGR valve 274 may be opened by controller 212 to recirculate exhaust gas to the intake 242 in order to reduce combustion chamber temperatures and reduce the amount of NOx gases generated during fuel combustion. In other examples, opening the EGR valve 274 to recirculate exhaust gas to the intake 242 may aid in increasing engine efficiency by reducing throttling losses, especially at lower engine loads, and by reducing thermal energy losses. Furthermore, recirculating exhaust gas via EGR valve 274 may aid fuel economy by reducing the effective combustion volume of the engine and maintaining enriched fuel-to-air ratios at lower fuel injection rates for the given engine load. Conversely, controller 212 may close EGR valve 274 to prevent recirculation of exhaust gas to intake 242 during very high engine load since the presence of exhaust gases during combustion may reduce the intake combustible charge density and may reduce peak engine power output. Controller 212 may also close EGR valve 274 during low-speed, idle, zero pedal, deceleration fuel shut-off (DFSO), or zero engine load conditions in order to reduce combustion instability and rough idle. Furthermore, controller 212 may close EGR valve 274 during engine braking, at high altitude when intake air oxygen concentration is lower due to lower ambient oxygen concentrations. Further still, the EGR valve 274 may be closed during low engine temperature conditions when NOx generation is lower.

Sensor 292 can include an exhaust gas temperature sensor that communicates with controller 212. Sensor 292 may also include an exhaust gas pressure sensor that can measure a back-pressure in the exhaust manifold 248. Further still, sensor 292 may include an oxygen sensor for determining an oxygen level or concentration in the exhaust manifold 248, upstream of the high pressure EGR line 270 and/or low pressure EGR line 272. As shown in FIG. 2, sensor 292 may be located upstream from exhaust gas aftertreatment device 290, however sensor 292 can optionally be located at the exhaust gas aftertreatment device 290, communicating the temperature of exhaust gas aftertreatment device 290 to controller 212. In a further example, sensor 292 may also be located upstream of the turbine 224, or downstream from exhaust gas aftertreatment device 290. Sensor 292 may also comprise a plurality of sensors configured at the above-mentioned positions. Sensor 292 can further comprise composition sensors such as hydrocarbon, NOx, or carbon monoxide sensors. Sensor 291 may include an EGR oxygen concentration sensor that transmits oxygen levels in the EGR line 291 to controller 212. As shown in FIG. 2, sensors 291 may be positioned at a middle position of the high pressure EGR line 270 and/or low pressure EGR line 272 and upstream from EGR valve 274, but in other examples, sensor 291 may be positioned at a more upstream or more downstream location in high pressure EGR line 270 and/or low pressure EGR line 272.

Depending on the signals from sensor 292, the controller 212 can execute various instructions to open EGR valve. For example, controller 212 may open and close EGR valve 274 to recirculate exhaust gas to the air intake 242 based on an oxygen concentration level in the exhaust gas (e.g., as determined from sensors 291, and/or 291), and/or an oxygen concentration level in the intake manifold 244 (e.g., as determined from sensor 219. In other examples, controller 212 may open and/or close EGR valve 274 to recirculate exhaust gas to the air intake 242 based on engine temperature, engine load, exhaust gas temperature, pedal position, and the like.

Controller 212 is shown in FIG. 2 as a conventional microcomputer including microprocessor unit 202, input/output ports 204, read-only memory 206, random access memory 208, keep alive memory 210, and a conventional data bus. Controller 212 is shown receiving various signals from sensors coupled to engine 110, in addition to those signals previously discussed, including: engine coolant temperature (ECT) from temperature sensor 212 coupled to cooling sleeve 214; a position sensor 194 coupled to an accelerator pedal 192 for sensing accelerator position adjusted by vehicle operator 102; a measurement of engine manifold pressure (MAP) from pressure sensor 216 coupled to intake manifold 244; a measurement of oxygen concentration at intake manifold 244 from sensor 219; boost pressure from pressure sensor 217 exhaust gas oxygen concentration from oxygen sensor 286; an engine position sensor from a Hall effect sensor 218 sensing position of crankshaft 240; a measurement of air mass entering the engine from sensor 220 (e.g., a hot wire air flow meter); and a measurement of throttle position from sensor 258. In one example, pedal position sensor 194 may sense a zero pedal during braking, tip out, or when a vehicle is coasting. Barometric pressure may also be sensed (sensor not shown) for processing by controller 211. In a preferred aspect of the present description, engine position sensor 218 produces a predetermined number of equally spaced pulses every revolution of the crankshaft from which engine speed (RPM) can be determined.

During operation, each cylinder within engine 110 typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 230 via intake manifold 244, and piston 236 moves to the bottom of the cylinder so as to increase the volume within combustion chamber 230. The position at which piston 236 is near the bottom of the cylinder and at the end of its stroke (e.g. when combustion chamber 230 is at its largest volume) is typically referred to by those of skill in the art as bottom dead center (BDC). During the compression stroke, intake valve 252 and exhaust valve 254 are closed. Piston 236 moves toward the cylinder head so as to compress the air within combustion chamber 230. The point at which piston 236 is at the end of its stroke and closest to the cylinder head (e.g. when combustion chamber 230 is at its smallest volume) is typically referred to by those of skill in the art as top dead center (TDC). In a process hereinafter referred to as direct injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 236 back to BDC. Crankshaft 240 converts piston movement into a rotational torque of the rotary shaft. Finally, during the exhaust stroke, the exhaust valve 254 opens to release the combusted air-fuel mixture to exhaust manifold 248 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Turning now to FIG. 3, a flow chart for a method 300 of controlling an EGR valve and exhaust gas recirculation is shown. Method 300 may be executed by a controller such as controller 212. Method 300 begins at 310 where vehicle operating conditions such as engine on condition (EOC), torque, vehicle speed, engine temperature, EGR valve status, and the like may be estimated and/or measured. Method 300 continues at 320 where it determines if the EGR valve is closed. In one embodiment, the EGR valve being closed may include if the EGR valve has just been closed. In another embodiment, the EGR valve being closed may include the EGR being closed for greater than a threshold time. For example, the EGR valve being closed greater than a threshold time may indicate that the EGR valve is not being cycled or opened in short bursts to purge the high pressure EGR line 270 and/or low pressure EGR line 272 (see 350 and FIG. 4 below). In another embodiment, method 300 at 310 may simply evaluate if EGR valve is currently closed. If the EGR valve is closed, method 300 continues to 330. If EGR valve is open, such as when recirculating exhaust gas to air intake 242, method 300 may end.

At 330, in response to the EGR valve being closed at 320, method 300 determines an oxygen concentration in the EGR system. In one example, the oxygen concentration in the EGR system may include the oxygen concentration in high pressure EGR line 270 and/or low pressure EGR line 272 as determined by sensor 291 and/or sensor 292. In other examples, the oxygen concentration in the EGR system may include the oxygen concentration in the exhaust manifold 248 as determined by an oxygen sensor such as a UEGO sensor 286. Oxygen sensors 286, 291, and 292 may also include HEGO sensors, NOx sensors, and other types of sensor which may be utilized for measuring oxygen content in gaseous mixtures.

In another embodiment, the oxygen concentration may be estimated or calculated based on a model of the intake air flow rates, fuel injection rates, and engine combustion rates. For example, knowing the engine combustion rates and conditions (e.g., engine temperature, engine speed, etc.), the consumption rates of oxygen and fuel can be estimated. Accordingly, the quantity of oxygen flowing through the engine cylinders to the exhaust (not combusted) can be estimated, as well as the flow rates of uncombusted fuel, and gaseous combustion byproducts such as carbon dioxide, carbon monoxide, nitrous oxides, and the like. Thus, based on the model of air and fuel flow and combustion rates, a concentration of oxygen in the exhaust manifold may be determined. Furthermore, the model may be used in conjunction with exhaust oxygen and NOx sensors. However, because the sensor dynamics may be slower, oxygen concentration calculations from the model may be used for providing faster pseudo-instantaneous feedback of the exhaust gas oxygen concentration, while the sensor measurements may be used for correcting the exhaust gas oxygen concentration to slower, long term exhaust gas oxygen concentration readings. As such, the exhaust gas concentration model may be leveraged for quicker, short term exhaust gas oxygen concentration values whereas both the oxygen sensors and/or model may be used to provide slower, longer term exhaust gas oxygen concentration values.

Next, at 340, method 300 determines if the EGR oxygen concentration is less than a first threshold oxygen concentration. As discussed above, the EGR oxygen concentration may be determined from one or more oxygen sensors, and/or from an air and fluid flow combustion model. The first threshold oxygen concentration may be a predetermined oxygen concentration according to the engine type and characteristics. For example, the first threshold oxygen concentration may be set at a concentration below which tip-in drivability is reduced when EGR is resumed. On the other hand, the first threshold oxygen concentration may be set at a concentration above which tip-in drivability is maintained, even if EGR is resumed. As a further example, the first threshold oxygen concentration may be set to a concentration above which drivability is maintained for engine operation even when EGR is resumed. As further example, the first threshold oxygen concentration may be calibrated to an oxygen concentration below which an error condition may result from ingesting a large quantity of EGR into the intake manifold. Furthermore, the first threshold oxygen concentration may vary depending on the engine operating conditions and driver habits. For example, a first threshold oxygen concentration may be adjusted to be higher for a case where a driver may tend to tip-in or accelerate aggressively, as compared to the case where a driver may tend to tip-in or accelerate moderately. In this way, the first threshold oxygen concentration may further be set according to learned driving habits or environmental and navigation-related route conditions. For example, if a driver's route, as indicated by a navigation system, indicates hilly terrain, a first threshold oxygen concentration may be set higher as compared to a more flat route. Further still, a threshold oxygen concentration may be adjusted based on one or more of filtered driver input data, instantaneous driver input data, lead-lag filtered driver input data, and derivative (slope rate of change) driver input data. As described above, examples of driver input data may include driver tip-in behavior, driver tip-out behavior, driver route conditions, other driver behavior tendencies, and the like.

If the EGR oxygen concentration is greater than the first threshold oxygen concentration, vehicle drivability may be maintained upon resuming EGR, and method 300 ends. If the EGR oxygen concentration is less than the first threshold oxygen concentration, method 300 continues at 350, where the EGR may be purged by opening the EGR valve. Opening the EGR valve at 350 may include opening the EGR valve intermittently, in short bursts, for less than a threshold valve opening, during an engine event where exhaust gas oxygen content is above a second threshold oxygen concentration, and the like. In this way, purging the EGR system may comprise various methods of opening the EGR valve, and may depend on current engine conditions, thereby introducing higher oxygen concentration gas into the EGR system to displace lower oxygen concentration gas that would otherwise be trapped in the EGR system, in one example.

Figure 4:
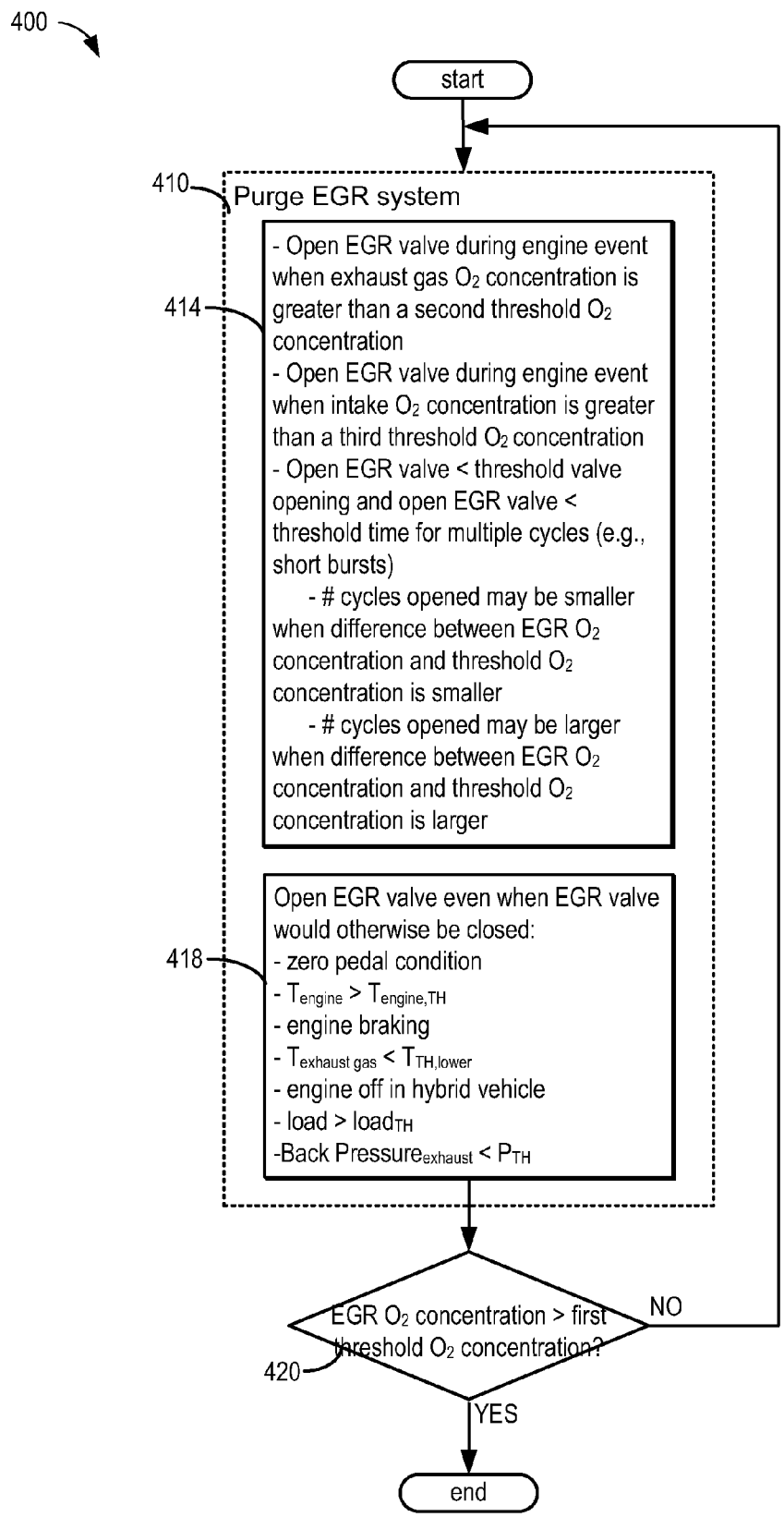
FIG. 4 shows a flow chart for an example method of recirculating exhaust gas in the engine of FIG. 2.

Turning now to FIG. 4, a flow chart illustrating various examples of purging the EGR system at 410 by opening EGR valve is shown. Purging the EGR system 410 may include various methods of opening the EGR valve at 414 and displacing gas that would otherwise remain in the EGR tubes. For example, the EGR valve may be opened during an engine event when the exhaust gas oxygen concentration is greater than a second threshold oxygen concentration. The exhaust gas oxygen concentration may correspond to an exhaust gas oxygen concentration upstream of the EGR. In one example, the exhaust gas oxygen concentration may be measured by an oxygen sensor such as UEGO 286 positioned in the exhaust manifold upstream of the EGR. In this way, exhaust gas having an oxygen content greater than the second threshold oxygen concentration may be admitted into the high pressure EGR line 270 and/or low pressure EGR line 272, and exhaust gas having an oxygen concentration less than a first threshold oxygen concentration may be at least partially displaced and thereby purged. The second threshold oxygen concentration may be greater than or equal to the first threshold oxygen concentration. Accordingly, when the EGR valve is opened, exhaust gas entering high pressure EGR line 270 and/or low pressure EGR line 272 increases the oxygen concentration in the EGR line 270. In some examples, purging the EGR system by opening the EGR valve may be performed only when the exhaust gas oxygen concentration upstream of the EGR is greater than a second threshold oxygen concentration because when the exhaust gas oxygen concentration upstream of the EGR is less than a second threshold oxygen concentration, purging the EGR system may not increase the oxygen concentration and may not aid in reducing engine misfires and engine stumbling and maintaining vehicle drivability when the EGR flow is resumed.

Furthermore, purging the EGR system by opening the EGR valve may be performed only when the exhaust gas oxygen concentration upstream of the EGR is greater than the oxygen concentration in the EGR line (high pressure EGR line 270 and/or low pressure EGR line 272).

Purging the EGR system may also include opening the EGR valve during an engine event when the intake oxygen concentration is greater than a third threshold oxygen concentration. The intake oxygen concentration may be determined by an oxygen sensor positioned at boost chamber 246 or intake manifold 244. The third threshold oxygen concentration may correspond to an intake oxygen concentration above which, coupled with the fuel injection rate and the engine combustion rates, an exhaust gas oxygen concentration upstream of the EGR may be greater than a first threshold oxygen concentration. As such, opening EGR valve to purge the EGR system may aid in increasing the EGR oxygen concentration above the first threshold oxygen concentration. In some embodiments, the EGR valve may be opened to purge the EGR system only when the intake oxygen concentration is greater than the third threshold oxygen concentration.

Furthermore, when purging the EGR system, the EGR valve may be opened less than a threshold valve opening and/or for less than a threshold time. In this way, disturbances to the engine combustion and vehicle drivability while purging the EGR system may be reduced since lower volumes of EGR with oxygen concentrations below the first threshold oxygen concentration, at slower and more gradual flow rates, may be introduced to the intake chamber. In one example, a threshold valve opening may comprise 100% full open. In other examples, a threshold valve opening may include valve openings less than 50% full open. The threshold valve opening may further include valve openings less than 25% full open. A threshold valve opening less than 100% full open may be advantageous in that disturbances to engine operation and combustion arising from purging the EGR system may be reduced. However, in some cases, purging the EGR system by pulsing the EGR valve 100% full open and closed with a smaller pulse-width and/or a smaller pulse frequency may reduce disturbances to engine operation and combustion arising from purging the EGR system on engine operation and combustion. The threshold time may comprise a short time interval where the EGR valve may pulsed open and closed once or repetitively, such as in short bursts, each short burst (e.g., valve opening and closing cycle) opening time being for a duration less than the threshold time, and the opening amount during each repeated opening being less than the threshold valve opening. The number of bursts, or valve opening and closing cycles, may be smaller when a difference between the EGR oxygen concentration and the threshold concentration is smaller. On the other hand, the number of bursts, or valve opening and closing cycles, may be larger when a difference between the EGR oxygen concentration and the threshold concentration is larger. Other methods of opening EGR valve to purge the EGR system may be used. For example, the EGR valve may be slowly ramped open to the threshold valve opening at a threshold valve opening rate. Furthermore an amplitude and/or pulse width of the opening and closing cycles of the EGR valve during purging of the EGR system may be smaller when a difference between the EGR oxygen concentration and the threshold concentration is smaller. On the other hand, the amplitude and/or pulse width of the opening and closing cycles of the EGR valve during purging of the EGR system may be larger when a difference between the EGR oxygen concentration and the threshold concentration is larger. Further still a frequency of the opening and closing cycles of the EGR valve during purging of the EGR system may be slower when a difference between the EGR oxygen concentration and the threshold concentration is smaller. On the other hand, the frequency of the opening and closing cycles of the EGR valve during purging of the EGR system may be higher when a difference between the EGR oxygen concentration and the threshold concentration is larger. In this way, purging of the EGR system can be performed expeditiously for cases where a difference between the EGR oxygen concentration and the threshold concentration is smaller and for cases where difference between the EGR oxygen concentration and the threshold concentration is larger.

Purging the EGR system may further comprise opening the EGR valve when the EGR valve would otherwise normally be closed at 418. For example, the EGR valve may be opened to purge the EGR system during a zero pedal condition, such as DFSO or tip-out after cresting a hill or while a vehicle may be coasting, or braking. During purging of the EGR system, because the EGR valve is opened less than a threshold valve opening for less than the threshold time, purging the EGR system during zero pedal conditions may avoid contributing to rough engine idle, and or unstable engine fuel combustion. As another example, the EGR valve may be opened to purge the EGR system when the engine temperature or an engine cylinder temperature, $T_{engine}$, is greater than a threshold engine temperature, $T_{engine,TH}$, during which the EGR valve would normally be closed for temperature protection. For example, the EGR valve may be opened to purge the EGR system when the EGR would normally be closed because $T_{engine}$ is near an engine operating temperature limit, for example $T_{engine}$ near an engine operating temperature above which an engine liquid coolant may boil. As another example, the EGR valve may be opened to purge the EGR system when an $T_{engine}$ is near an engine operating temperature limit wherein engine coolant is used to remove heat from the EGR system via an EGR cooler 278, and wherein an EGR valve may be normally closed to reduce heat rejection to the coolant. Further still, the EGR valve may be opened to purge the EGR system when an $T_{engine}$ is near an engine operating temperature limit wherein engine coolant is used to remove heat from the EGR system via an EGR cooler 278, and wherein engine coolant is used to provide cooling to the engine oil, and the EGR valve is normally closed.

Purging the EGR system may further include opening the EGR valve during other engine operating conditions during which the EGR valve would otherwise be closed. For example, the EGR valve may be opened to purge the EGR system while engine braking is performed. Furthermore, the EGR valve may be opened to purge the EGR system when the engine is cold after starting the engine and before the engine has warmed up (e.g., the engine temperature is less than a threshold engine temperature, and/or the exhaust gas temperature is less than a threshold exhaust gas temperature). Accordingly, even when the engine is cold (engine temperature is less than a threshold engine temperature), the EGR oxygen concentration may be raised above a first threshold oxygen concentration so that upon resumption of the EGR operation, where the EGR valve is opened greater than a threshold valve opening and/or for longer than a threshold time, engine operability and vehicle drivability may be maintained while reducing engine misfires and engine stumbling.

As another example, the EGR valve may be opened to purge the EGR system while the engine is OFF in a hybrid electric vehicle. In this way, the EGR system oxygen concentration can be maintained above a first threshold oxygen concentration, even when the engine is off and a hybrid electric vehicle is being propelled by an electric motor. Thus, the EGR oxygen concentration may be raised above a first threshold oxygen concentration so that when the engine is switched ON, opening the EGR valve may maintain vehicle drivability and reduce engine stumbles and misfires due to low oxygen concentrations in the EGR.

As another example, the EGR valve may be opened to purge the EGR system even when an engine load is greater than a threshold engine load, $load_{TH}$. When the engine load is greater than $load_{TH}$, the EGR valve may be opened less than a threshold valve opening and/or for less than a threshold time to purge the EGR system, while maintaining a higher air intake and oxygen inflow to the engine and maintaining a higher engine power output. Accordingly, the EGR oxygen concentration may be raised above a first threshold oxygen concentration so that when the engine load returns to below $load_{TH}$, the EGR valve may be opened (e.g., greater than a threshold valve opening and/or longer than a threshold time) to recirculate exhaust gas to the engine intake while maintaining engine operability, vehicle drivability, and reducing engine stumbles and misfires.

As another example, the EGR valve may be opened to purge the EGR system even when an exhaust manifold back-pressure is less than a threshold pressure. The exhaust manifold back-pressure may be measured by sensor 292. Back-pressure may be generated from aftertreatment devices 290 downstream from the EGR. Although the back-pressure may be lower (e.g., lower than a threshold pressure), the EGR valve may be opened less than a threshold valve opening and/or less than a threshold time in order to purge the EGR system. Accordingly, the EGR oxygen concentration may be gradually increased above a first threshold oxygen concentration so that upon resumption of EGR operation, where the EGR valve is opened greater than a threshold valve opening for longer than a threshold time, engine operability and vehicle drivability may be maintained.

Next, method 400 continues at 420, where it is determined if the EGR oxygen concentration is greater than the first threshold oxygen concentration. If the EGR oxygen concentration is below the first threshold oxygen concentration, method 400 returns to 410 to continue purging the EGR system, as described above, in order to raise the EGR oxygen concentration. On the other hand, if the EGR oxygen concentration is above the first threshold oxygen concentration, the EGR operation may be resumed while maintaining engine operability and vehicle drivability while reducing engine stumbles and misfires, and method 400 ends.

In this manner a method for an engine may comprise purging an EGR system when an EGR oxygen content is less than a threshold oxygen content, the EGR oxygen content determined in response to an EGR valve closing. Purging the EGR system may comprise opening the EGR valve less than a threshold valve opening. Furthermore, purging the EGR system may comprise opening the EGR valve less than a first threshold time. Further still, purging the EGR system may comprise closing the EGR valve when the intake oxygen level is greater than the upper threshold oxygen level. Further still, purging the EGR system may be stopped when the EGR content is greater than the threshold oxygen content. Further still, the EGR valve closing may comprise the EGR valve closing for longer than the first threshold time. Further still, purging the EGR system may comprise opening the EGR valve only when an intake oxygen level is greater than a threshold intake oxygen level.

In this manner, a method for a vehicle engine may comprise: purging an EGR system, including opening an EGR valve, when the EGR valve would otherwise be closed, based on a measured oxygen concentration of the EGR system being less than a threshold oxygen concentration. The measured oxygen concentration may be measured after closing the EGR valve. Furthermore, opening the EGR valve may include opening the EGR valve a threshold valve opening and then closing the EGR valve after a threshold time. Further still, opening the EGR valve may include opening the EGR valve a threshold valve opening and then closing the EGR valve after a threshold time for a predetermined number of cycles. The predetermined number of cycles may be smaller when a difference between the measured oxygen concentration and the threshold oxygen concentration is smaller, and the predetermined number of cycles may be larger when a difference between the measured oxygen concentration and the threshold oxygen concentration is larger. Furthermore, purging the EGR system may comprise one or more of opening the EGR valve during a zero pedal condition, opening the EGR valve during an engine braking condition, opening the EGR valve when the exhaust gas temperature is less than a threshold exhaust temperature, opening the EGR valve when the engine is off in a hybrid vehicle, opening the EGR valve when an engine load is greater than a threshold load, and opening the EGR valve when an engine cylinder temperature is greater than a threshold engine temperature.

Turning now to FIG. 5, it illustrates an example timeline 500 for operation of a vehicle engine. Timeline 500 depicts trend lines for EGR valve status 510, EGR purge status, EGR oxygen concentration 520, exhaust manifold oxygen concentration 530, and pedal level 540. Also depicted are threshold valve openings 518 and 516, a first threshold oxygen concentration 526, and a second threshold oxygen concentration 536. The second threshold oxygen concentration 536 may be greater than or equal to the first threshold oxygen concentration 526.

Prior to time, t1, the EGR valve is open greater than threshold valve openings 516 and 518 and greater than a threshold time 504, and exhaust gas may be recirculating to the engine intake. Furthermore, the EGR oxygen concentration 520 may be greater than a first threshold oxygen concentration 526, and an exhaust manifold oxygen concentration measured upstream of the EGR may be greater than a second threshold oxygen concentration 536. The EGR purge status 502 is OFF because the EGR oxygen concentration 520 is greater than a first threshold oxygen concentration 526.

At time, t1, the EGR valve status 510 may be switched closed, for example, in response to an engine load greater than $load_{TH}$ being requested. In response, controller 212 may determine that the EGR oxygen concentration 520 is greater than a threshold oxygen concentration. Accordingly, the controller 212 may maintain the EGR purge status OFF since resuming the EGR may not reduce engine operability, vehicle drivability or cause engine misfiring. At time, t2, the EGR valve 510 is opened, allowing EGR to resume. Between times t2 and t3, the EGR oxygen concentration 520 decreases below the first threshold oxygen concentration 526, and the exhaust manifold oxygen concentration 530 (upstream of EGR) increases above the second threshold oxygen concentration 536.

At time, t3, the EGR valve is closed, in response to an engine event such as a load being greater than $load_{TH}$, engine temperature greater than a threshold engine temperature. In response to the EGR valve closing, controller 212 measures the EGR oxygen concentration 520. Controller 212 may being purging the EGR system (EGR purge status switched ON) since the oxygen concentration 520 is less than the first oxygen concentration threshold 526, and resuming EGR may reduce engine operability and vehicle drivability, and increase engine misfires and stumbling. Furthermore, because the exhaust manifold oxygen concentration 530 is greater than the second threshold oxygen concentration 536, purging the EGR system may aid in raising the EGR oxygen concentration 520 above the first threshold oxygen concentration 526.

Between times t3 and t4, purging of the EGR system includes opening the EGR valve status less than a first threshold valve opening 518 for less than a threshold time 504. As shown in timeline 500, the EGR valve is cycled open and closed between times t3 and t4 multiple times. Each time the EGR valve is cycled open and closed, the EGR oxygen concentration may be raised by a small amount. After the third cycling of the EGR valve, the EGR oxygen concentration is raised above the first threshold oxygen concentration. Thus, after the final cycling of the EGR valve to purge the EGR system, the EGR operation may be resumed, and engine misfires and engine stumbling may be reduced while maintaining vehicle drivability and engine operability. Furthermore, even though the pedal level decreases to zero (e.g., DFSO) between t3 and t4, the EGR valve status may still be opened to purge the EGR since the EGR purge status is ON, the EGR oxygen concentration 520 is less than the first threshold oxygen concentration 526, and the exhaust manifold oxygen concentration 530 is greater than the second threshold oxygen concentration 536.

At time, t4, the EGR valve is opened, and EGR purge status 502 is switched OFF. At time, t5, the EGR valve is closed again. In response, controller 212 measures the EGR oxygen concentration 520. Since the EGR oxygen concentration 520 is less than a first threshold oxygen concentration 526, the EGR purge status 502 is switched ON. Subsequently, between t5 and t6, the EGR valve is repeatedly cycled open and closed, wherein the valve is opened greater than a second threshold valve opening 516 for a threshold time 504 before being closed. Since the difference between the EGR oxygen concentration and the first threshold oxygen concentration between times t5 and t6 is larger as compared to the difference between the EGR oxygen concentration and the first threshold oxygen concentration between times t3 and t4, during purging of the EGR, the EGR valve is opened greater than a first threshold valve opening 518 but less than a second threshold valve opening 516, in order to more expeditiously purge the EGR system. Furthermore, since the difference between the EGR oxygen concentration and the first threshold oxygen concentration between times t5 and t6 is larger as compared to the difference between the EGR oxygen concentration and the first threshold oxygen concentration between times t3 and t4, during purging of the EGR, the EGR valve is opened for a larger pulse width (e.g., larger as compared to the pulse widths used for purging the EGR system between times t3 and t4, but less than a threshold time 504) in order to more expeditiously purge the EGR system. As shown in timeline 500, purging the EGR system raises the EGR oxygen concentration above the first threshold oxygen concentration before time, t6. After time t6, EGR purge is switched OFF and the EGR valve is opened, resuming EGR operation.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
responsive to an exhaust gas recirculation (EGR) valve closing, determining an oxygen content downstream of an engine exhaust and upstream of the EGR valve in an EGR system; and
when the oxygen content is below a threshold, fluidly coupling an engine intake with the exhaust via the EGR system by opening the EGR valve, during operating conditions when it would otherwise be closed, to purge the EGR system into the intake.

2. The method of claim 1, wherein purging the EGR system comprises opening the EGR valve less than a threshold valve opening.

3. The method of claim 2, wherein purging the EGR system further comprises opening the EGR valve less than a first threshold time.

4. The method of claim 3, wherein purging the EGR system further comprises closing the EGR valve when an intake oxygen level is greater than an upper threshold oxygen level.

5. The method of claim 1, wherein purging the EGR system is stopped when the oxygen content is greater than the threshold oxygen content.

6. The method of claim 1, wherein the EGR valve closing comprises the EGR valve closing for longer than a first threshold time.

7. The method of claim 1, wherein purging the EGR system comprises opening the EGR valve only when an intake oxygen level is greater than a threshold intake oxygen level.

8. A method for a vehicle engine, comprising:
purging an exhaust gas recirculation (EGR) system, including opening an EGR valve, when the EGR valve would otherwise be closed, based on a measured oxygen concentration of the EGR system being less than a threshold oxygen concentration, wherein purging the EGR system comprises opening the EGR valve when an engine cylinder temperature is greater than a threshold engine temperature.

9. The method of claim 8, wherein the measured oxygen concentration is measured after closing the EGR valve.

10. The method of claim 8, wherein opening the EGR valve includes opening the EGR valve a threshold valve opening and then closing the EGR valve after a threshold time.

11. The method of claim 10, wherein opening the EGR valve includes opening the EGR valve a threshold valve opening and then closing the EGR valve after the threshold time for a predetermined number of cycles.

12. The method of claim 11, wherein the predetermined number of cycles is smaller when a difference between the measured oxygen concentration and the threshold oxygen concentration is smaller, and wherein the predetermined number of cycles is larger when a difference between the measured oxygen concentration and the threshold oxygen concentration is larger.

13. The method of claim 8, wherein purging the EGR system further comprises opening the EGR valve during a zero pedal condition.

14. The method of claim 8, wherein purging the EGR system further comprises opening the EGR valve during an engine braking condition.

15. The method of claim 8, wherein purging the EGR system further comprises opening the EGR valve when the exhaust gas temperature is less than a threshold exhaust temperature.

16. The method of claim 8, wherein purging the EGR system further comprises opening the EGR valve when the engine is off in a hybrid vehicle.

17. The method of claim 8, wherein purging the EGR system further comprises opening the EGR valve when an engine load is greater than a threshold load.

18. An engine system, comprising:
an exhaust gas recirculation (EGR) system, comprising an EGR valve arranged in an EGR line coupling an engine intake with an engine exhaust; and
a controller, including executable instructions to:
in response to the EGR valve closing,
determine an EGR oxygen content in the EGR line; and
during engine operating conditions when the EGR valve would otherwise be closed, fluidly couple the intake with the exhaust by opening the EGR valve to purge the EGR system into the intake when the EGR oxygen content is less than a threshold oxygen content.

19. The engine system of claim 18, wherein the executable instructions further include determining the EGR oxygen content based on air flow rate and fuel flow rate to the engine.

20. A method for a vehicle engine, comprising:
purging an exhaust gas recirculation (EGR) system, including opening an EGR valve, when the EGR valve would otherwise be closed, based on a measured oxygen concentration of the EGR system being less than a threshold oxygen concentration,
wherein opening the EGR valve includes opening the EGR valve a threshold valve opening and then closing the EGR valve after a threshold time for a predetermined number of cycles, and
wherein the predetermined number of cycles is smaller when a difference between the measured oxygen concentration and the threshold oxygen concentration is smaller, and wherein the predetermined number of cycles is larger when a difference between the measured oxygen concentration and the threshold oxygen concentration is larger.

* * * * *